United States Patent [19]

Gans et al.

[11] Patent Number: 4,756,045
[45] Date of Patent: Jul. 12, 1988

[54] VACUUM CLEANER HOSE HAVING ALTERNATING HEIGHT CORRUGATIONS

[75] Inventors: Leo Gans, Teaneck; Michael Truppo, Budd Lake, both of N.J.

[73] Assignee: Action Technology, N.J.

[21] Appl. No.: 947,598

[22] Filed: Dec. 30, 1986

Related U.S. Application Data

[63] Continuation-in-part of Ser. No. 871,159, Jun. 2, 1986, abandoned, which is a continuation of Ser. No. 683,346, Dec. 19, 1984, abandoned.

[51] Int. Cl.⁴ .......................... A47G 29/08; F16F 7/00
[52] U.S. Cl. .................................. 15/257 A; 138/121; 138/122; 138/178; 181/207
[58] Field of Search ................. 138/118, 121, 122, 37, 138/39, 178; 181/227, 229, 230, 247, 248, 249, 252; 15/257 A

[56] References Cited

U.S. PATENT DOCUMENTS

| | | | |
|---|---|---|---|
| 3,234,969 | 2/1966 | Du Mont | 138/121 |
| 3,572,393 | 3/1971 | Eisert | 138/121 |
| 3,605,817 | 9/1971 | Baumon et al. | 138/121 |
| 3,823,702 | 2/1958 | November | 138/121 |
| 4,712,642 | 12/1987 | Lalikos et al. | 181/207 |

Primary Examiner—James E. Bryant, III
Attorney, Agent, or Firm—Morgan & Finnegan

[57] ABSTRACT

A vacuum cleaner hose comprises alternating height corrugations which break up airflow and reduce or eliminate whistle during vacuum cleaner operation. The hose likewise provides a high degree of flexibility, crush and kink resistance, and returnability back to its original shape. The hose may be formed of a single non-reinforced member by an extrusion blow-molding process. In one embodiment, the widths of the corrugations alternate with the heights.

11 Claims, 3 Drawing Sheets

VACUUM CLEANER HOSE HAVING ALTERNATING HEIGHT CORRUGATIONS

BACKGROUND OF THE INVENTION

This application is a continuation-in-part of U.S. patent application Ser. No. 06/871,159 filed June 2, 1986 which is a continuation of U.S. patent application Ser. No. 06/683,346 filed Dec. 19, 1984 both now abandoned.

The invention pertains to flexible air vacuum hoses. More particularly, the invention pertains to air vacuum hoses produced by an extrusion blow-molding process.

Extrusion blow-molding is a well-known process for providing lightweight, flexible and inexpensive hoses of many types of constructions. Extrusion blow-molding is particularly useful in the production of thermoplastic tubing.

It is likewise known to use extrusion blow-molding processes to fabricate air vacuum cleaner hoses. With an appropriate mold, air vacuum cleaner hoses may be fabricated having convolutions or corrugations which can give added flexibility, crush and kink resistance, and returnability back to the original shape of the hose.

Although hoses produced by extrusion blow-molding have found widespread application in the vacuum cleaner industry, during use of the hoses with a vacuum source, the flexible corrugated tubing has been found to generate an annoying whistle which increases in intensity with the operating intensity of the vacuum source.

Prior attempts to reduce the whistling noise have included using expensive flexible resins having specific resonance frequencies. The use of such resins, however, increases the cost of the hose and causes the hose to be less kink resistant.

Other prior attempts to limit the whistling noise of vacuum cleaner hoses involved providing protuberances and gaps within the interior profile of known, corrugated thermoplastic tubing. See, Bauman et al, U.S. Pat. No. 3,605,817 (Sept. 20, 1971). Bauman ('817) also discloses that the width of hose convolutes as measured along the longitudinal axis may be varied from large to small either gradually or abruptly along the length of the corrugated tubing, in order to attenuate the annoying whistling which may occur when such tubing is used in connection with vacuum apparatus.

U.S. Pat. No. 4,034,499 to Wild (July 12, 1977) discloses a hollow, plastic tube with convolutions provided to create, rather than diminish, the irritating whistling noise. The Wild hose was provided with a means for swingably rotating the hose to thereby create a current of air therewithin resulting in a musical tone.

It is known to vary the dimensionality of extrusion blow-molded hoses to, e.g., improve the flexibility thereof. See, Osborn et al, U.S. Pat. No. 3,313,319 (Apr. 11, 1967). It has also been disclosed to provide a corrugated flexible hose including convolutions along one end which are dimensionally varied from the remainder of the convolutions to provide a stiffer portion at one end of the hose to facilitate connection to a member while retaining flexibility of the hose. See, Huston et al, U.S. Pat. No. 3,794,080 (Feb. 26, 1984).

Alternating diameter convolutions have been provided in rubber hoses to increase the collapsibility thereof. See, Eisert, U.S. Pat. No. 3,572,393 (Mar. 23, 1971). A convoluted metal hose has also been provided with alternating height convolutes to enable it to withstand extremely high internal pressure. See, November, U.S. Pat. No. 2,823,702 (Feb. 18, 1958).

Corrugated rubber hoses, e.g., for use in automotive radiator applications, have concerned manipulating corrugations and convolutes primarily to effect increased flexibility, strength or attachment features. See, for example, U.S. Pat. Nos. 2,622,623 to Michaudet (Dec. 23, 1952), 3,234,969 to Du Mont (Feb. 15, 1966) and 3,540,489 to Hanson (Nov. 17, 1970).

It has not heretofore been known to manipulate the heights of corrugations in light weight thermoplastic hoses such as may be produced by an extrusion blow molding process in order to attenuate the whistling noise produced when such hoses are used in conjunction with a vacuum source.

It is therefore an object of the invention to provide a hose which does not produce a whistling noise when used in conjunction with a vacuum source.

It is a further object of the invention to provide a vacuum hose having a pattern of corrugations which breaks up airflow to eliminate whistle during vacuum cleaner operation.

It is a still further object of the invention to provide a lightweight, noiseless vacuum cleaner hose having a high degree of flexibility, crush and kink resistance, and returnability back to its original shape.

It is a still further object of the invention to provide a lightweight, noiseless vacuum cleaner hose which may be produced by an extrusion blow-molding process.

SUMMARY OF THE INVENTION

These and other objects of the invention are met by providing a lightweight, flexible vacuum cleaner hose having a regular pattern of alternating height convolutions. During operation in conjunction with a vacuum source, the pattern design of the corrugations breaks up airflow within the vacuum hose thereby eliminating the annoying whistling noise commonly and previously associated with such operations. An air vacuum cleaner hose in accordance with the instant invention may be easily fabricated using a well-known extrusion blow-molding process resulting in an inexpensive, lightweight and flexible hose. In one embodiment, the widths of the corrugations alternate with the heights.

BRIEF DESCRIPTION OF THE DRAWINGS

The invention will be described more fully below by way of reference to the following drawings, in which.

DETAILED DESCRIPTION OF THE DRAWINGS

Figure 1:
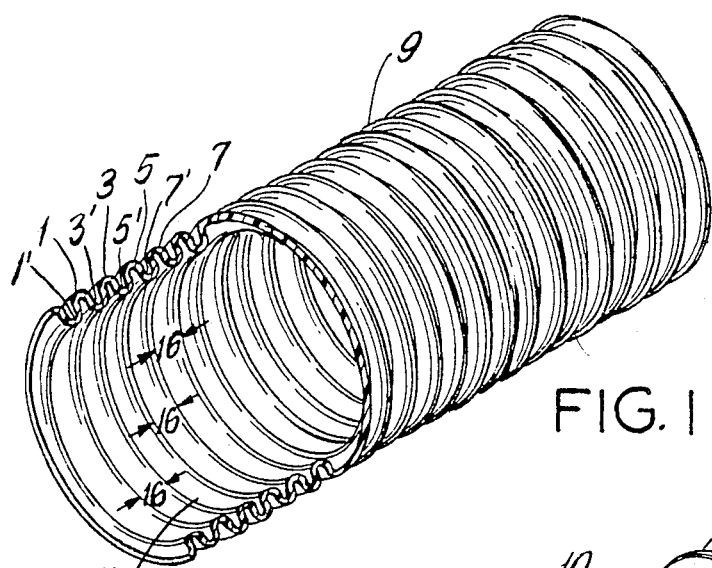
FIG. 1 is a perspective view of a length of corrugated hose of the prior art comprising regular height convolutions, a portion of the hose having been broken away to facilitate an understanding of its internal configuration.

FIG. 1 illustrates a portion of a vacuum hose 9 which is well-known in the vacuum cleaner hose industry. Vacuum cleaner hose 9 is such as may be formed of a thermoplastic material by an extrusion blow-molding process. The hose 9 comprises corrugations 1, 3, 5, 7 formed in a regular pattern and at a constant height above the adjacent troughs 1', 3', 5', 7' throughout the length of the hose. The corrugations 1, 3, 5, 7 of hose 9 are also regular in width.

An examination of the interior pattern 11 of the hose of FIG. 1 reveals the same regularity in the height and width pattern of the corrugations. This is because the material thickness of the hose 9 is substantially uniform.

The hose of FIG. 1 is well-known and may easily be fabricated from conventional extrusion blow-molding processes such as are described in U.S. Pat. No. 2,728,356, issued Dec. 27, 1955, to Brinsmade et al. Such hoses of the prior art are lightweight, kink and crush resistant, and relatively inexpensive. Other similar prior art hoses having uniform height corrugations have short flat sections between adjacent sections of corrugations at the base thereof, i.e. in the regions similar to throughs 1', 3', 5', 7' of FIG. 1.

However, when the corrugated hoses of the prior art, such as the hose of FIG. 1, are used in conjunction with a vacuum cleaning apparatus, an annoying whistling noise is commonly generated.

Figure 2:
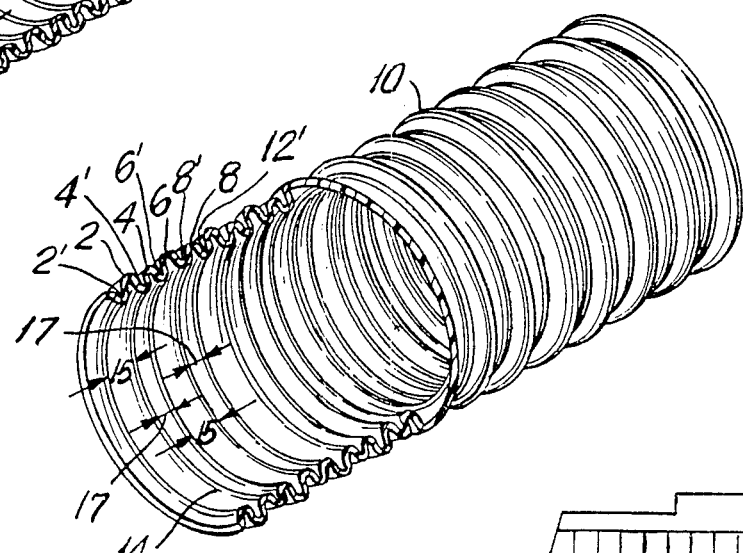
FIG. 2 is a perspective view of a section of corrugated tubing in accordance with the instant invention, a portion of which has been broken away to facilitate an understanding of its internal configuration.

FIG. 2 illustrates a corrugated vacuum hose 10, having alternating height corrugations in accordance with the instant invention, which eliminates or reduces the above-described whistling noise. The hose 10 comprises a regular pattern of alternating height corrugations 2, 4, 6, 8. As with the hose 9 of the prior art, the thickness of the corrugated section is reasonably uniform such that substantially the same corrugated configuration defines the interior surface of the tubing as the exterior surface.

A comparison between the prior art hose 9 of FIG. 1 and the vacuum hose 10 according to the instant invention (FIG. 2) reveals differences in the height and width of the corrugations. Each hose 9, 10 comprises a series of convolutions having alternating crests and troughs. The hose of the prior art 9 (FIG. 1) includes corrugations 1, 3, 5, 7 whose crests are at equal heights above the troughs 1', 3', 5', 7' therebetween. However, in the hose according to the instant invention 10 (FIG. 2), adjacent corrugations 2, 4, 6, 8 have different heights above their adjacent troughs 2', 4', 6', 8' in an alternating manner.

For example, in the hose 10 according to the instant invention, a first corrugation 2 has a crest height above adjacent trough 2' which is greater than the height at which its adjacent corrugation 4 crests above adjacent trough 4'. Similarly, the next adjacent corrugation 6 crests at a greater height above adjacent trough 6', then does the former adjacent corrugation 4. The next adjacent corrugation 8 crests at a lower height above adjacent trough 8' than does the former adjacent corrugation 6. In preferred hoses according to the instant invention, there will be a regular pattern of alternating height corrugations such that a greater height corrugation is located adjacent to a lesser height corrugation, which is respectively located adjacent to a greater height corrugation, etc. in a repeating, alternating fashion.

It is contemplated that hoses of the instant invention will have particular utility as products of extrusion blow-molding fabrication techniques wherein a thermoplastic material (e.g., a polyolefin such as low density polyethylene, linear low density polyethylene, high density polyethylene, or co-polymers thereof) is applied to a mold in a substantially uniform thickness. In this technique, the corrugation pattern is generally drawn from a uniform wall of molten plastic tube. During this drawing, certain sections of the wall near the outer diameter of the profile may become somewhat thinner than sections near the inner diameter. However, in general, substantial uniformity in the thickness of application will preferably result in an interior pattern which reflects the alternating height convolutes which appear on the external surface of the hose.

In the hose 9 of the prior art (FIG. 1), the interior configuration 11 is substantially regular, having adjacent corrugations of equal height spaced equidistantly apart, all of the corrugations having the same width 16, as would be expected based on the pattern of the external hose configuration. However, in the hose 10 according to the instant invention (FIG. 2), the troughs 4' and 6', 8' and 12' which respectively surround lesser height corrugations 4, 8 are spaced more closely together than are the troughs 2' and 4', 6' and 8', which respectively surround corrugations 2, 6 of greater height. This is because, in preferred embodiments of the invention, the lower height corrugations 4, 8 are formed of a width 17 which is narrower than the width 15 of the greater height corrugations 2, 6. Thus, not only does the instant invention provide alternating height convolutes, but in preferred embodiments, it also contemplates corrugations having alternating widths.

Figure 3:
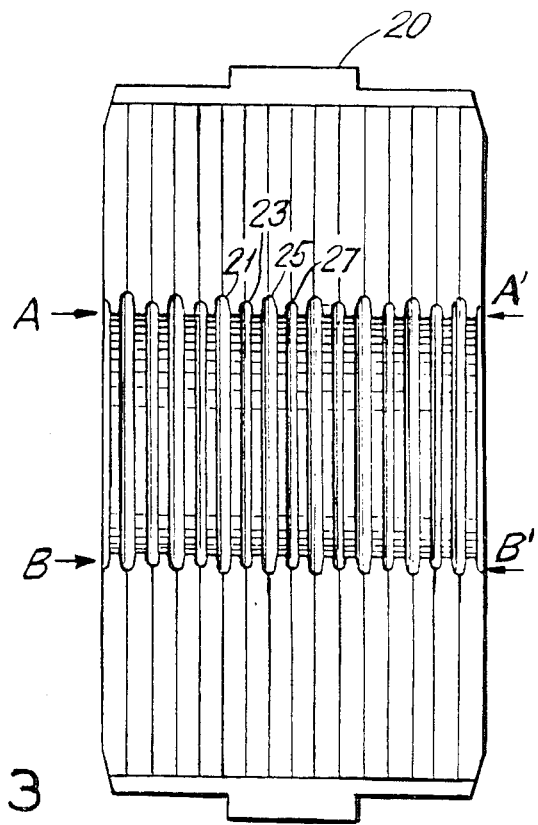
FIG. 3 is a sectional view of a molding apparatus die block as may be used in the formation of a hose according to the instant invention.
Figure 4:
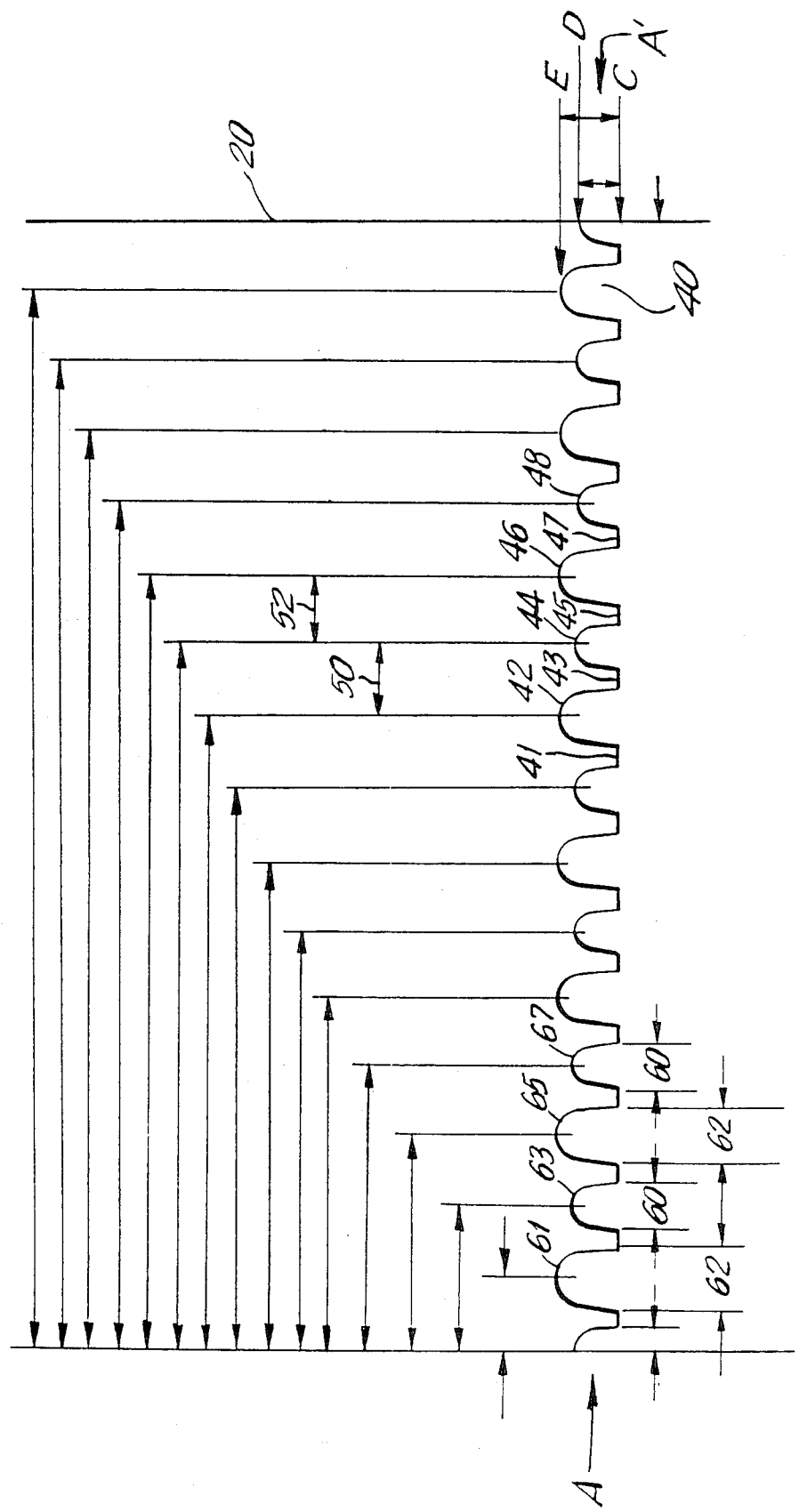
FIG. 4 is an enlargement of a portion of the molding surface of the die of FIG. 3 taken roughly along the line A—A'.

As mentioned above, it is contemplated that the instant invention will find particular utility as a product of extrusion blow-molding. FIGS. 3 and 4 illustrate partial cross-sectional portions of a die mold 20 such as may be provided in an extrusion blow-molding apparatus for effecting the alternating height corrugations in accordance with the instant invention.

FIG. 3 illustrates a die or mold 20 such as may be provided in extrusion blow-molding apparatuses, said mold 20 having a pattern which will form an apparatus according to the invention. Such dies are commonly formed of metal and have internal cylindrical surfaces defining the configuration of the ultimate product.

In terms of FIG. 3 and the instant invention, there is illustrated a first internal surface portion, defined roughly by the line A—A', having a pattern useful in providing an extrusion blow-molded hose in accordance with the instant invention. The die 20 includes annular recesses 21, 23, 25, 27 of alternating height. The alternating height recesses 21, 23, 25, 27 form a hose pattern according to the instant invention when thermoplastic material is applied thereto.

A second illustrated internal surface portion, defined roughly as the line B—B' in the mold 20 of FIG. 3, appears to be the inverse of the upper portion A—A' as may be expected since the illustration of FIG. 3 presents a planar sectional view of a substantially cylindrical shape. The lower surface B—B' of the die roughly resembles what the internal corrugation pattern will look like in the ultimate extrusion blow-molded hose product.

Note that the widths of the lower height corrugation forming portions 23, 27 are narrower than are the greater height corrugation forming portions 21, 25. Thus, die 20 will produce a preferred vacuum hose according to the instant invention wherein the widths of the corrugations alternate with the alternating heights.

FIG. 4 is a larger scale view of the "upper" surface of FIG. 3 taken substantially along the line A–A'. FIG. 4 illustrates a mold portion such that if a thermoplastic material was applied along the interior surface 40 thereof, a corrugated hose would result having corrugations whose heights alternate from greater to lesser to greater to lesser, etc., in a regular alternating pattern. Mold portion 20 includes portions for forming greater height corrugations 42, 46; portions for forming lower height corrugations 44, 48; and portions for forming troughs 41, 43, 45, 47 between adjacent corrugations. In terms of the mold 20 of FIG. 3, the corrugation forming portions 42, 44, 46, 48 are seen as annular rings. The heights of the adjacent corrugation forming portions illustrated in FIG. 4 alternate between greater and lesser, i.e., corrugation forming portion 42 produces a corrugation having a greater height above adjacent trough portion 43 than does adjacent corrugation forming portion 44.

Also illustrated in FIG. 4 are three lines C, D, and E. The first line C intersects the trough forming portions 41, 43, 45, 47. Second line D intersects lower height corrugation forming portions 44, 48 at their crests. Third line E intersects greater height corrugation forming portions 42, 46 at their crests. Thus, it may be seen from FIG. 4 that a preferred embodiment of the invention fabricated from the mold of FIGS. 3 and 4 will include adjacent corrugations having heights which alternate from greater to lower to greater to lower, etc., with respect to the height of the crest of said corrugations above their adjacent troughs.

In a preferred embodiment of the instant invention, the convolutes also are spaced equidistantly apart respective the center line of each corrugation. Thus, for example, in terms of the mold which will produce such a vacuum hose (see FIG. 4), the distance 50 between the bisecting line passing through a first corrugation forming portion 42 and the bisecting line passing through an adjacent corrugation forming portion 44 is equal to the distance 52 between the center line of the same adjacent corrugation forming portion 44 and the next adjacent corrugation forming portion 46. Again, the corrugation forming portions referred to herein are seen in the die mold 20 of FIG. 3 as annular rings. This equidistant pattern is repeated throughout the die and, upon application of a thermoplastic, produces a pattern of regularly spaced corrugations. In a preferred embodiment, the distance between the bisecting lines of each adjacent convolute forming portion of the die 20 of FIGS. 3 and 4 are spaced apart at a distance of 0.125 inches.

In preferred embodiments such as will be produced by the die of FIG. 4, greater height corrugations will also be substantially wider than are the lower height corrugations adjacent thereto. For example, die portions 61, 65 which form greater height corrugations may have a width 62 of 0.114 inches while the die portions 63, 67 which form the lower height convolutes may have a lesser width 60 of 0.086 inches. Upon application of a thermoplastic to the interior surface 40 of such a die, a preferred vacuum hose according to the instant invention will be formed wherein the widths of the corrugations vary with the heights.

Note that alternating height patterns other than those illustrated in FIGS. 2, 3 and 4 may, of course, be provided within the scope of the invention. For example, three or more heights of corrugations may be alternated in various repeating or random patterns and achieve the same effect of breaking up the sound wave structure inside the hose.

It will be, of course, further understood that a vacuum hose in accordance with the instant invention may be formed using processes other than extrusion blow-molding. However, at the present time extrusion blow-molding offers the most reliable and least expensive method of providing hoses in accordance with the instant invention.

Figure 5:
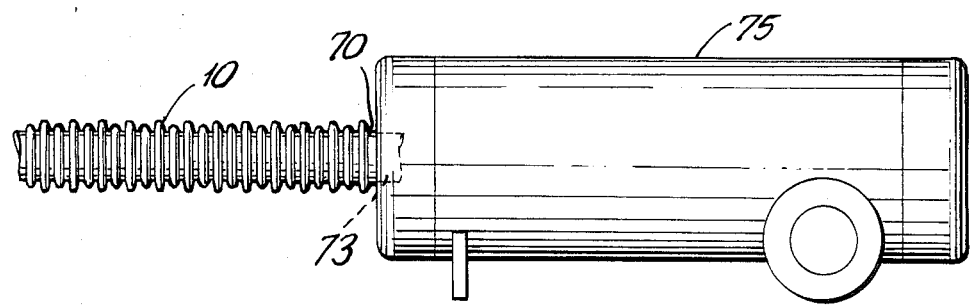
FIG. 5 is an elevation of a hose according to the invention shown attached to a standard vacuum cleaner.

FIG. 5 illustrates a hose 10 according to the invention coupled through a connector joint 70 to an air intake port 73 of a standard vacuum cleaner 75. In one embodiment, connector joint 70 is blow-molded continuously with the remainder of hose 10. In other embodiments, the connector joint may be a molded fitting which is either snapped-over or inserted into the hose for engagement with the vacuum. In such embodiments, the hose itself does not assemble directly to the vacuum although embodiments are contemplated in which the hose would connect directly to the vaccum, hose retaining or connecting means such as rings or lags being provided within the vacuum itself for coupling the hose.

As stated above, the pattern design of a corrugated hose 10 in accordance with the instant invention is such that airflow through hose 10 will be broken up during operation of vacuum cleaner 75 so as to eliminate the whistling noise previously associated with such operations. Such hoses offer significant advantages over hoses of the prior art which were unable to eliminate whistling vacuum noise. It is, of course, further contemplated that the invention may be operative with a wide variety of vacuum cleaners, such as standard horizontal canisters of the type shown in FIG. 5 and indoor/outdoor and wet/dry canister type vacuum cleaners such as those sold under the trademark JETVAC by Shelton.

Hoses produced in accordance with the instant invention using an extrusion blow-molding process are lightweight and possess a high degree of flexibility, crush and kink resistance, and memory or returnability back to their original shape. Furthermore, the design of preferred hoses according to the invention will meet and exceed all known A.S.T.M. testing specification standards. Further still, the preferred extrusion blow-molded construction results in a one-piece, seamless construction which is free of welds and associated failure points.

Although the invention has been described fully and clearly herein by way of reference to the drawings and illustrations provided, these should be deemed to in no way limit the spirit of the invention or the scope of the claims which follow.

We claim:

1. In combination, a vacuum cleaner and an air vacuum hose, said air vacuum hose comprising:

a hollow tubular-shaped member formed of a thermoplastic material, said tubular-shaped member being adapted to have a high degree of flexibility, crush and kink resistance and returnability back to its original shape, said tubular-shaped member further having a corrugated configuration such that the exterior peaks and valleys of the exterior surface respectively form the interior peaks and valleys of the hollow interior surface, said interior peaks having a substantially annular shape, said corrugations further contributing to the aforementioned flexibility, crush and kink resistance and returnability characteristics, wherein the heights of said corrugation peaks alternate between greater and lesser in an alternating series, such that a plurality of said corrugations having greater height peaks are each adjacent corrugations having lesser height peaks and a plurality of said corrugations having lesser height peaks are each adjacent corrugations having greater height peaks, said air vacuum hose being coupled by connecting means to an air intake port of said vacuum cleaner; and said tubular-shaped member being characterized by being substantially whistle-free as a result of airflow breakup resulting from said corrugated configuration when air passes through said member during operation of the vacuum cleaner.

2. The combination of claim 1, wherein said tubular-shaped member includes a portion wherein said peaks having a greater height are substantially all adjacent said peaks having a lesser height and wherein said peaks having a lesser height are substantially all adjacent said peaks having a greater height.

3. The combination of claim 2, wherein said tubular-shaped member includes a portion wherein a plurality of corrugations having a greater width are respectively and intermixedly adjacent a plurality of corrugations having a lesser width.

4. The combination of claim 3, wherein said tubular-shaped member includes a portion wherein corrugations having a greater width are substantially all adjacent corrugations having a lesser width and corrugations having a lesser width are substantially all adjacent corrugations having a greater width.

5. The combinations of claim 3, wherein ones of said plurality of corrugations having a greater width comprise ones of said peaks having a greater height and ones of said plurality of corrugations having a lesser width comprise ones of said peaks having a lesser height.

6. In combination, a vacuum cleaner and an air vacuum hose, said air vacuum hose comprising:
   a hollow tubular-shaped member formed of a thermoplastic material, said tubular-shaped member being adapted to have a high degree of flexibility, crush and kink resistance and returnability back to its original shape, said tubular-shaped member further having a corrugated configuration such that the exterior peaks and valleys of the exterior surface respectively form the interior peaks and valleys of the hollow interior surface, said corrugations further contributing to the aforementioned flexibility, crush and kink resistance and returnability characteristics, the interior peaks and valleys having a substantially annular shape, wherein a portion of said member includes a series of said interior peaks having heights which alternate between higher and lower, said higher and lower height peaks each defining substantial corrugations;
   said air vacuum hose being connected to an air intake port of said vacuum cleaner, and said tubular-shaped member being characterized by being substantially whistle-free when air passes therethrough during operations of the vacuum cleaner as a result of airflow break-up due to said corrugated configuration.

7. The combination of claim 6, wherein said portion comprises wider corrugations having higher peaks intermixedly adjacent narrower corrugations having lower peaks in an alternating series thereof.

8. The combination of claim 1, wherein said connecting means includes either a hose end continuously blow-molded at an end of said tubular member, or a molded fitting snapped-over or inserted into said end of said tubular member.

9. The combination of claim 6, wherein said connecting means includes either a hose end continuously blow-molded at an end of said tubular member, or a molded fitting snapped-over or inserted into said end of said tubular member.

10. The combination of claim 1, wherein said alternating series continues substantially throughout the entire length of the member and wherein said peaks are spaced equidistantly throughout said member.

11. The continuation of claim 6, wherein said alternating series continues substantially throughout the entire length of the member and wherein said peaks are spaced equidistantly throughout said member.

* * * * *